United States Patent
Farmer et al.

(10) Patent No.: US 11,089,079 B2
(45) Date of Patent: Aug. 10, 2021

(54) ASYNCHRONOUSLY READING HTTP RESPONSES IN SEPARATE PROCESS

(71) Applicant: INTERNATIONAL BUSINESS MACHINES CORPORATION, Armonk, NY (US)

(72) Inventors: James V. Farmer, Wappingers Falls, NY (US); Mark R. Gambino, Brewster, NY (US); Daniel L. Yee, Newtown, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 253 days.

(21) Appl. No.: 15/820,508

(22) Filed: Nov. 22, 2017

(65) Prior Publication Data
US 2019/0158566 A1    May 23, 2019

(51) Int. Cl.
| H04L 29/08 | (2006.01) |
| G06F 9/445 | (2018.01) |
| G06F 9/46 | (2006.01) |
| H04L 29/06 | (2006.01) |

(52) U.S. Cl.
CPC .............. *H04L 67/02* (2013.01); *G06F 9/445* (2013.01); *G06F 9/44505* (2013.01); *G06F 9/46* (2013.01); *H04L 67/42* (2013.01); *H04L 69/329* (2013.01)

(58) Field of Classification Search
CPC ....... H04L 67/02; H04L 67/42; H04L 67/142; H04L 69/329
See application file for complete search history.

(56) References Cited

U.S. PATENT DOCUMENTS

| 5,935,212 A | 8/1999 | Kalajan et al. |
| 6,338,089 B1 | 1/2002 | Quinlan |
| 6,397,253 B1 | 5/2002 | Quinlan |
| 6,496,824 B1 | 12/2002 | Wilf |
| 6,519,643 B1 | 2/2003 | Foulkes |
| 6,535,878 B1 * | 3/2003 | Guedalia ............... G06F 9/4843 |

(Continued)

FOREIGN PATENT DOCUMENTS

| WO | WO-0219105 A1 * | 3/2002 | ............... G06F 9/54 |

OTHER PUBLICATIONS

Gang et al., "Method for converting HTTP synchronous requests to asynchronous processing, and server",1998, ip.com translation of CN-108319508-A (Year: 2018).*

(Continued)

*Primary Examiner* — Aaron N Strange
(74) *Attorney, Agent, or Firm* — Cantor Colburn LLP; Teddi Maranzano

(57) ABSTRACT

Technical solutions are described for reading HTTP responses in separate processes being executed by a client computing device. An example method includes sending an HTTP request from an application program executed by a first process, the HTTP request being sent for receipt by a server. The method further includes storing application identification associated with the HTTP request, and terminating the first process. The method further includes, in response to receiving a HTTP reply from the server, determining that the HTTP reply is corresponding to the HTTP request based on the application identification, and passing the HTTP reply to the application program.

14 Claims, 3 Drawing Sheets

(56) References Cited

U.S. PATENT DOCUMENTS

| | | | |
|---|---|---|---|
| 6,876,654 B1* | 4/2005 | Hegde | H04L 12/4625 370/392 |
| 7,843,952 B2 | 11/2010 | Roe et al. | |
| 7,894,431 B2 | 2/2011 | Goring et al. | |
| 7,929,523 B2 | 4/2011 | Shenfield et al. | |
| 8,176,486 B2 | 5/2012 | Husain | |
| 8,458,331 B2* | 6/2013 | Chauhan | H04L 67/26 709/225 |
| 9,246,976 B2 | 1/2016 | Kang | |
| 10,069,757 B1* | 9/2018 | Young | H04L 43/0817 |
| 10,453,092 B1* | 10/2019 | Wang | G06Q 30/0275 |
| 2002/0099844 A1 | 7/2002 | Baumann | |
| 2004/0003093 A1* | 1/2004 | Kamath | G06F 9/54 709/227 |
| 2004/0143645 A1* | 7/2004 | Cheenath | H04L 29/06 709/218 |
| 2006/0248207 A1* | 11/2006 | Olson | G06F 9/5027 709/230 |
| 2007/0083524 A1* | 4/2007 | Fung | H04L 12/66 |
| 2008/0270924 A1 | 10/2008 | Yordanov | |
| 2010/0082823 A1 | 4/2010 | Cui | |
| 2010/0153432 A1* | 6/2010 | Pfeifer | G06F 16/289 707/769 |
| 2010/0161712 A1* | 6/2010 | Mehta | G06Q 10/06 709/203 |
| 2011/0078703 A1* | 3/2011 | Dokovski | G06F 16/9574 719/315 |
| 2011/0246640 A1* | 10/2011 | Saha | G06F 11/3476 709/224 |
| 2012/0079063 A1* | 3/2012 | Brown | H04L 51/24 709/217 |
| 2012/0079111 A1 | 3/2012 | Luukkala | |
| 2015/0271271 A1 | 9/2015 | Bullotta et al. | |
| 2016/0352869 A1* | 12/2016 | Liddicott | H04L 69/162 |
| 2019/0158604 A1* | 5/2019 | Farmer | H04L 67/14 |

OTHER PUBLICATIONS

Hu et al., "Measuring the Impact of Event Dispatching and Concurrency Models on Web Server Performance Over High-speed Networks", 1997, In Proc. of GLOBECOM 97 (Year: 1997).*

James V. Farmer et al. "Sharing System Managed HTTP Client Sessions Across Processes", U.S. Appl. No. 15/820,498, Nov. 22, 2017.

List of IBM Patents or Patent Applications Treated as Related; (Appendix P), Filed Nov. 22, 2017; 2 pages.

GitHub, "AsyncHttpClient/async-http-client/ Asynchronous Http and WebSocket Client library for Java," Retrieved from Internet using: https://github.com/AsyncHttpClient/async-http-client, 2017, pp. 1-5.

J. Arcand, "Writing Portable WebSockets Application using Java," Think Thank for http://Async-IO.org, Retrieved from Internet using: https://jfarcand.wordpress.com/category/async-http-client/, May 28, 2012, pp. 1-11.

Wikipedia, "Transaction Processing Facility", Oct. 30, 2017, pp. 1-7.

Etelqasmi et al., "RESTful web services for service provisioning in next-generation networks: a survey," IEEE Communications Magazine 49, No. 12, 2011, pp. 1-9.

* cited by examiner

ASYNCHRONOUSLY READING HTTP RESPONSES IN SEPARATE PROCESS

BACKGROUND

The present invention generally relates to computer technology and particularly to improving the performance of a system that executes application programs that communicate with one or more remote servers using hypertext transfer protocol (HTTP).

Hypertext Transfer Protocol (HTTP) is an application protocol, typically used by distributed information systems. The HTTP protocol is a request-reply protocol where an HTTP client sends a request to an HTTP server and the HTTP client waits for a reply from the HTTP server.

SUMMARY

According to one or more embodiments for reading HTTP responses in separate processes being executed by a client computing device, an example method includes sending an HTTP request from an application program executed by a first process, the HTTP request being sent for receipt by a server. The method further includes storing application identification associated with the HTTP request, and terminating the first process. The method further includes, in response to receiving a HTTP reply from the server, determining that the HTTP reply is corresponding to the HTTP request based on the application identification, and passing the HTTP reply to the application program.

According to one or more embodiments, a system includes a server, and a client device that communicates with the server using HTTP. The client device reads HTTP responses in separate processes being executed by the client device by sending an HTTP request from an application program executed by a first process, the HTTP request being sent for receipt by a server. The client device further stores application identification associated with the HTTP request, and terminates the first process. The client device further, in response to receiving a HTTP reply from the server, determines that the HTTP reply is corresponding to the HTTP request based on the application identification, and passes the HTTP reply to the application program.

According to one or more embodiments, a computer program product includes a computer readable storage medium having program instructions embodied therewith, the program instructions executable by a processing circuit of a client computing device to cause the processing circuit to read HTTP responses in separate processes by sending an HTTP request from an application program executed by a first process, the HTTP request being sent for receipt by a server. The processing circuit further stores application identification associated with the HTTP request, and terminates the first process. The processing circuit further, in response to receiving a HTTP reply from the server, determines that the HTTP reply is corresponding to the HTTP request based on the application identification, and passes the HTTP reply to the application program.

BRIEF DESCRIPTION OF THE DRAWINGS

The examples described throughout the present document will be better understood with reference to the following drawings and description. The components in the figures are not necessarily to scale. Moreover, in the figures, like-referenced numerals designate corresponding parts throughout the different views.

DETAILED DESCRIPTION

Figure 1:
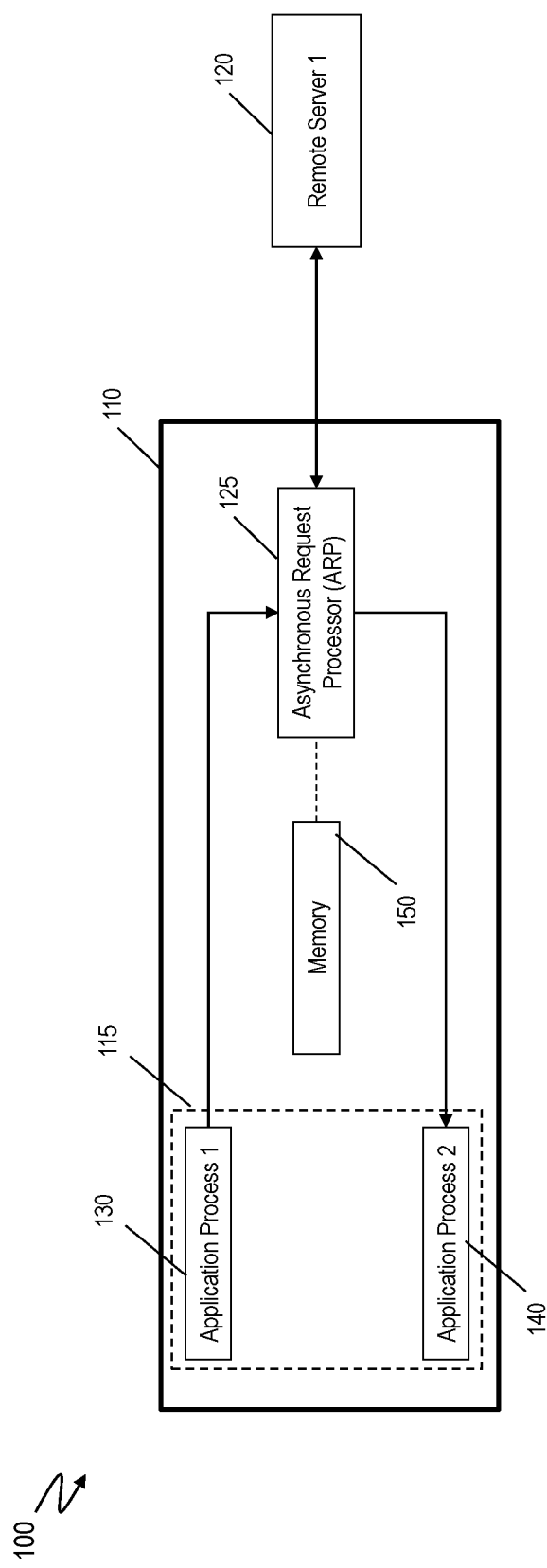
FIG. 1 depicts an example system for reading http responses in separate processes according to one or more embodiments.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Typically, for HTTP based client-server systems, after a client process executing on a client device has sent a request to a server, that client process, and one or more threads associated with that client process, wait for a corresponding reply from the server. In computing, and as used herein, a 'process' is an instance of a computer program that is being executed by an operating system of a computing device. The process contains the program code and current activity of the executing instance, such as user data, variable values, and other such attributes.

This poses a technical challenge because the number of active processes/threads that can execute concurrently on the client device is limited, regardless of operating system, processor, and other types of hardware/software of the client device. The time that the server takes to respond can thus, affect the number of processes/threads active at any point in time on the client device. The number of active threads impacts the performance of the client device. If there is a high volume of HTTP client requests and it takes longer for reply messages to arrive (due to network problems, or issues with one or more servers, etc.), the number of active HTTP client processes/threads increases and negatively impacts the performance of the client device.

For example, consider an online transaction processing (OLTP) workloads, such as payment systems, medical systems, reservation systems, and the like, where the performance of the system is critical. A drop in performance caused by the number of active threads at the client device can prevent transactions from being processed in a timely manner or at all in such situations. For example, consider that a node is receiving 1000 transaction requests per second and each of those transactions requires the node to send an HTTP message to a server, and receive a corresponding reply. Here, the node is the client device communicating with the server. At 1000 HTTP client requests per second, consider that a reply comes back in 10 milliseconds (ms). Accordingly, on average, at any point in time, there are 10 active HTTP client processes/threads waiting for a reply at the node. Now if an issue arises at the server, the communication network, or any other component, that affects the performance such that instead of responding in 10 ms, the reply takes 1.5 seconds. If the issue persists for a period of time lasting one minute, in the first 1.5 seconds alone the issue causes 1500 active HTTP client processes/threads at the node, which exceeds performance limits on most operating systems presently available. Further, over the next 58.5 seconds of the issue, the number of HTTP client processes/threads would grow to well over 15,000, which is well beyond the limits of any platform. In other words, the node may either crash, hang, or be slow with the transaction processing rate changing from 1000 transactions per second to less than 100 transactions per second.

The technical solutions described herein address such technical challenges. In one or more examples, the technical solutions facilitate the client process to exit after the request is sent. When the reply arrives, the operating system of the client device creates a new client process to handle the reply. In other words, while waiting for an HTTP reply message, there are no active processes. This way, the system can have any number of (for example, thousands) outstanding HTTP client requests without any active processes on the operating system of the client device. Thus, the technical solutions facilitate an asynchronous request to be sent by an HTTP client session without a client process/thread managing the client session or waiting for the reply. This allows for minimum system resources in use while applications of the client device wait for replies from remote servers; thus, facilitating the system to process concurrent transactions without performance degradation. The technical solutions described herein thus facilitate an improvement to computing technology, and particularly to a client-server system using HTTP based communication.

Thus, in one or more examples, a first client process of a client device sends an HTTP request to a remote server, and exits. Upon receipt of a corresponding reply from the remote server, the client device initiates a second client process and provides the reply data for further processing by the second client process that is newly created.

FIG. 1 depicts an example system 100 for reading http responses in separate processes according to one or more embodiments of the present invention. The system 100 includes, among other components, a client computing device 110 in communication with a remote server 120. The computing device 110 communicates with the remote server 120 via a communication network via one or more communication nodes, such as routers, gateways, access points, and other such nodes in a wired or a wireless manner. The communication network may be Ethernet, WIFI, 4G, 3G, LTE, or any other type of communication network or a combination thereof. The client computing device 110 communicates with the remote server 120 in response to an application program 115, which is being executed by the client computing device 110, sending and/or receiving data to/from the remote server 120.

The application program 115 may be a web-browser, an e-commerce application, a payment portal, a computer game, an e-book, or any other type of application that accesses the remote server 120 for completion of one or more operations. The communication may be performed using the HTTP and/or the HTTPS protocol. It should be noted that the application program 115 may be one of multiple application programs that are being executed by the client computing device 110, and in one or more examples may be one of the multiple instances of an application program.

Further, the application program 115 may be associated with at least one process of the client computing device. The process may be executed using one or more process threads, and the process 'exit' represents the one or more threads associated with the process no longer being active. Herein, 'execution thread' and 'process thread' may be used interchangeably. As depicted in FIG. 1, the application program 115 may use a first application process 130 for execution of one or more operations of the application program 115.

The first application process 130 establishes communication with the remote server 120 via an HTTP exchange, such as using an HTTP cookie which identifies the state, such as a unique session ID, information about the user's preferences or authorization level, and other state parameters. For example, HTTP communication uses a Common Gateway Interface (CGI) that facilitates maintaining an HTTP client session and supporting HTTP cookies and file uploads. Typically, the client-server sessions are maintained by the transport layer—a single connection for a single session. However, each transaction phase of a Web/HTTP session creates a separate connection. Maintaining session continuity between phases requires a session ID. The session ID is embedded within the <A HREF> or <FORM> links of dynamic web pages so that it is passed back to the CGI. CGI then uses the session ID to ensure session continuity between transaction phases. It should be noted that HTTP communication may be used by application processes differently than the above description. For example, HTTP is used at the transport for REST APIs to that mobile/cloud users can consume services on the server 120, such as applications and database servers (such as IBM® Z/TPF). Alternatively, or in addition, the application process 130 can also use HTTP to transport proprietary message formats. In other words, the application process 130 may be any type of client application (browser, REST client, user application, and so on) that is using HTTP, the technical solutions described herein facilitating improvements for execution of such application process 130.

Further, the client computing device 110 includes a second application process 140 that the client computing device 110 creates (initiates) upon receiving a reply from the server 120. In one or more examples, the second application process 140 is created by an asynchronous Request Processor (ARP) 125 of the client computing device 110. The ARP 125 may be part of an operating system of the client computing device 110. For example, the ARP 125 may be a module of the operating system. In one or more examples, the ARP 125 receives a command from the first application process 130 to send an HTTP request to the server 120. The ARP 125, in one or more examples, provides one or more interfaces for the first application process 130 to send the command, for example, an application programming interface (API). Further, the ARP 125 generates a corresponding HTTP request per the command from the first application process 130, and sends the HTTP request to the server 120. In one or more examples, the ARP 125 sends the HTTP request via a kernel socket (not shown) to the server 120. The kernel socket may be shared across multiple application processes of the client computing device 110, and is active even if no application process is active on the client computing device 110.

In one or more examples, the ARP 125 informs the first application process 130 to exit after the HTTP request has been sent to the server 120. In one or more examples, the ARP 125 stores identification information for the first application process 130 in a memory 150. The identification information may be stored in the memory 150 prior to informing the first application process 130 to exit. The memory 150 may be accessible by one or more other application processes being executed by the client computing device 110. In one or more examples, the memory 150 is main memory (RAM), or a portion thereof of the client computing device 110. Alternatively, or in addition, the memory 150 may be a portion of a storage device of the client computing device 110. The memory 150 may be a predetermined portion of the main memory and/or the storage device of the client computing device 110. It should be noted that the memory 150 may store multiple instances of identification information corresponding to respective application processes that have sent HTTP requests.

In one or more examples, the ARP 125 may maintain multiple portions in the memory 150, each portion corresponding to one or more sockets used, where each socket is used for sending/receiving data to a respective server 120. For example, the remote server 120 is a first server that is communicated with via a first socket, and identification information of application processes communicating with the first remote server are stored in a first memory portion. Further, a second memory portion is used to store identification information of application processes that have sent requests to a second remote server, via a corresponding second socket. It should be noted that the sockets, servers, and application processes may be mapped in a different manner than the examples described herein.

The identification information includes data that the ARP 125 can use to match a reply from the server 120 with the application program 115. The identification information, in one or more examples, includes a unique identifier of the application program 115, such as a process identifier, a global unique identifier (GUID) or any other type of unique identifier, which may be an alphanumeric string or the like. Further, the identification information includes a unique identifier of the kernel socket being used for sending the HTTP request to the server 120. Further yet, in one or more examples, the ARP 125 receives application parameters that that application program 115 wants to use when the reply from the server 120 is available. The ARP stores the application parameters in the memory 150, either associated with or as part of the identification information.

Further, when the ARP 125 receives a reply to the HTTP request from the first application process 130 from the server 120, the ARP 125 creates the second application process 140. The ARP 125 associates the received reply with the second application process 140. The ARP 125 further determines the application program 115 for which the reply from the remote server 120 has been received. For example, the determination is made based on a comparison of one or more parameters in the reply with the identification information stored in the memory 150. The ARP 125 invokes the identified application program in the second application process 140, which now receives the reply from the server 120. In one or more examples, the ARP 125 further receives one or more application parameters from the first application process 130, prior to exiting, and stores the parameters in the memory 150. The ARP 125 subsequently passes the application parameters to the application program when handling the control of the second application process 140 to the application program.

The application program 115 thus sends an HTTP request to and receives a corresponding reply from the server 120 without an active application process/thread while the HTTP request is being processed by the server 120 and is being communicated via the network. Thus, the number of active application processes/threads in the client computing device 110, and particularly the operating system are reduced.

Figure 2:
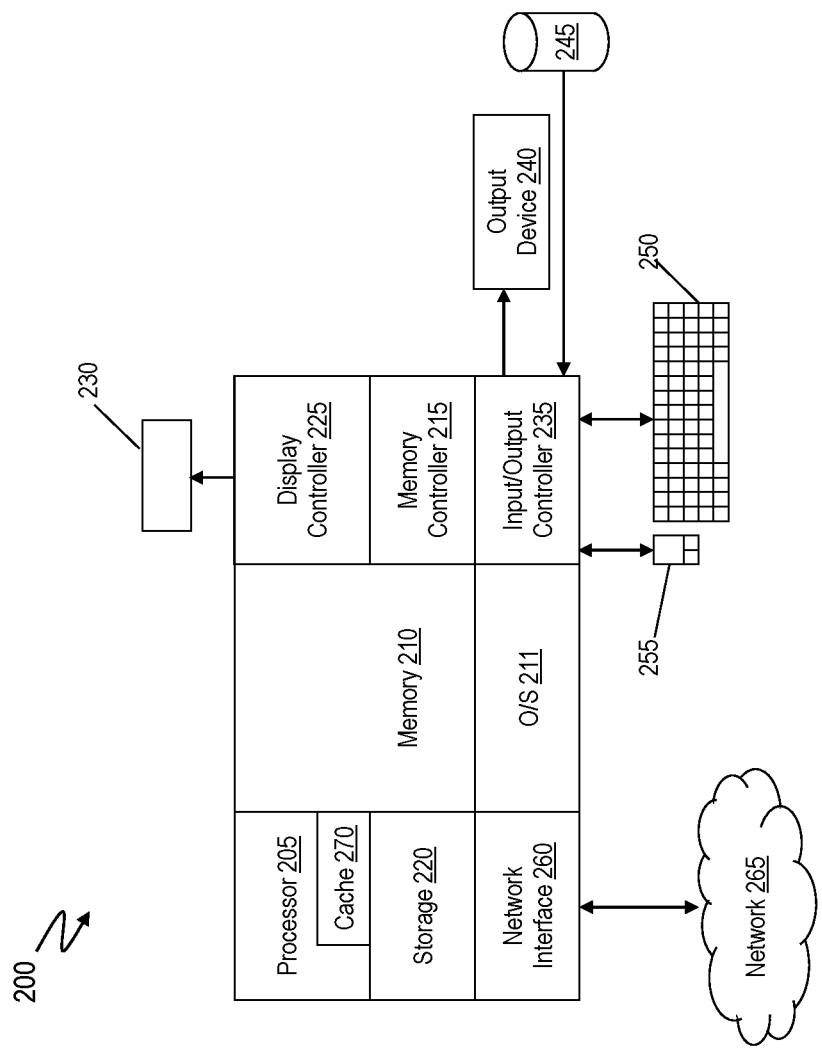
FIG. 2 illustrates an example system according to one or more embodiments.

FIG. 2 illustrates an example system 200 according to one or more embodiments. The system 200 may be a communication apparatus, such as a computer. For example, the system 200 may be a desktop computer, a tablet computer, a laptop computer, a phone, such as a smartphone, a server computer, or any other device that communicates via a network 265. The system 200 includes hardware, such as electronic circuitry. In one or more examples, the system 200 is any one or more of the devices depicted in FIG. 1, such as the client computing device 110, the remote server 120, or one or more components thereof.

The system 200 includes, among other components, a processor 205, memory 210 coupled to a memory controller 215, and one or more input devices 245 and/or output devices 240, such as peripheral or control devices, which are communicatively coupled via a local I/O controller 235. These devices 240 and 245 may include, for example, battery sensors, position sensors, indicator/identification lights and the like. Input devices such as a conventional keyboard 250 and mouse 255 may be coupled to the I/O controller 235. The I/O controller 235 may be, for example, one or more buses or other wired or wireless connections, as are known in the art. The I/O controller 235 may have additional elements, which are omitted for simplicity, such as controllers, buffers (caches), drivers, repeaters, and receivers, to enable communications.

The I/O devices 240, 245 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 205 is a hardware device for executing hardware instructions or software, particularly those stored in memory 210. The processor 205 may be a custom made or commercially available processor, a central processing unit (CPU), an auxiliary processor among several processors associated with the system 200, a semiconductor based microprocessor (in the form of a microchip or chip set), a macroprocessor, or other device for executing instructions. The processor 205 includes a cache 270, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 270 may be organized as a hierarchy of more cache levels (L1, L2, and so on.).

The memory 210 may include one or combinations of volatile memory elements (for example, random access memory, RAM, such as DRAM, SRAM, SDRAM) and nonvolatile memory elements (for example, ROM, erasable programmable read only memory (EPROM), electronically erasable programmable read only memory (EEPROM), programmable read only memory (PROM), tape, compact disc read only memory (CD-ROM), disk, diskette, cartridge, cassette or the like). Moreover, the memory 210 may incorporate electronic, magnetic, optical, or other types of storage media. Note that the memory 210 may have a distributed architecture, where various components are situated remote from one another but may be accessed by the processor 205.

The instructions in memory 210 may include one or more separate programs, each of which comprises an ordered listing of executable instructions for implementing logical functions. In the example of FIG. 2, the instructions in the memory 210 include a suitable operating system (OS) 211. The operating system 211 essentially may control the execution of other computer programs and provides scheduling, input-output control, file and data management, memory management, and communication control and related services.

Additional data, including, for example, instructions for the processor 205 or other retrievable information, may be stored in storage 220, which may be a storage device such as a hard disk drive or solid state drive. The stored instructions in memory 210 or in storage 220 may include those enabling the processor to execute one or more aspects of the systems and methods described herein.

The system 200 may further include a display controller 225 coupled to a user interface or display 230. In some embodiments, the display 230 may be an LCD screen. In other embodiments, the display 230 may include a plurality of LED status lights. In some embodiments, the system 200 may further include a network interface 260 for coupling to a network 265. The network 265 may be an IP-based network for communication between the system 200 and an external server, client and the like via a broadband connection. In an embodiment, the network 265 may be a satellite network. The network 265 transmits and receives data between the system 200 and external systems. In some embodiments, the network 265 may be a managed IP network administered by a service provider. The network 265 may be implemented in a wireless fashion, for example, using wireless protocols and technologies, such as WiFi, WiMax, satellite, or any other. The network 265 may also be a packet-switched network such as a local area network, wide area network, metropolitan area network, the Internet, or other similar type of network environment. The network 265 may be a fixed wireless network, a wireless local area network (LAN), a wireless wide area network (WAN) a personal area network (PAN), a virtual private network (VPN), intranet or other suitable network system and may include equipment for receiving and transmitting signals.

Figure 3:
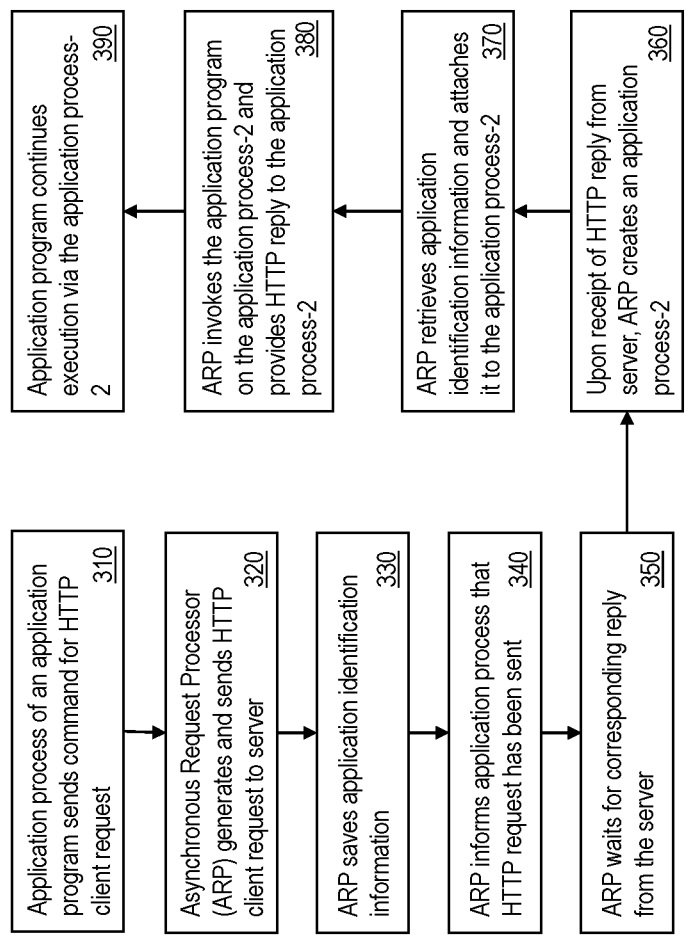
FIG. 3 depicts a flowchart of an example method for reading http responses in separate processes according to one or more embodiments.

FIG. 3 depicts a flowchart of an example method for reading HTTP responses in separate processes according to one or more embodiments. The method is implemented by one or more of the components of the system 100, and as described herein facilitates for HTTP client processes to terminate processing and exit after sending an HTTP client request to a remote server. The method includes the ARP 125 from the OS 211 of the computing device 110 receiving a command to generate an HTTP request from the first application process 130 of the application program 115, at 310. In one or more examples, the command specifically indicates that an asynchronous HTTP request is to be generated, and the method described herein is implemented only if such an indication is provided. If the command does not indicate that an asynchronous HTTP request is to be generated, rather indicates that a synchronous HTTP request is to be generated, the OS 211 generates and sends an HTTP request corresponding to the command to the request and the first application process 130 continues to wait for the subsequent reply from the server 120.

In case the asynchronous HTTP request is commanded, the ARP 125 generates and sends a corresponding HTTP client request to the server 120, at 320. Further, the ARP 125 captures and stores application identification information for the application program 115 that is being executed via the first application process 130, at 330.

The application identification information includes the name of the application program 115 to invoke the application program 115 when a corresponding reply from the server 120 is received along with optional data to pass to the application program 115 upon such invocation. Additionally, the identification information includes data that the ARP 125 can use to match a reply from the server 120 with the application program 115. The identification information, in one or more examples, includes a unique identifier of the application program 115, a global unique identifier (GUID) or any other type of unique identifier, which may be an alphanumeric string or the like. Further, the identification information includes a unique identifier of the kernel socket being used for sending the HTTP request to the server 120. Further yet, in one or more examples, the ARP 125 receives application parameters that that application program 115 wants to use when the reply from the server 120 is available. The ARP stores the application parameters in the memory 150, either associated with or as part of the identification information.

In one or more examples, the ARP 125 maintains multiple portions in the memory 150, each portion corresponding to the specific socket from one or more sockets being used for communication. Each socket is used for sending/receiving data to a respective server 120. Accordingly, in one or more examples, storing the application identification information further includes identifying a memory portion associated with the server 120, and/or the kernel socket used for sending the HTTP request to the server 120, and storing the application identification information in the identified memory portion. In one or more examples, the socket used by the ARP 125 to send the HTTP request to the server 120 is unique to the pair of the application program 115 and the server 120. Accordingly, upon receipt of the reply from the server 120 on the socket, the ARP 125 can determine the corresponding application program 115 that the reply is to be forwarded.

Further, the method includes the ARP 125 informing the first application process 130 that the HTTP request has been sent successfully, at 340. In one or more examples, upon the informing by the ARP 125 the first application process 130 terminates/exits, because the application process 130 is no longer associated with the transaction for which the HTTP request has been sent. Thus, the ARP 125 reduces the number of active application processes in the OS 211.

Further, the client computing device 110 awaits a reply from the server 120 for the HTTP request that was sent from the application program 115, at 350. The OS 211 continues operating continuously during such a wait. For example, the operation may include sending and receiving HTTP data to/from the server 120 and/or other servers for operations of other application programs.

Upon receipt of the reply corresponding to the application program 115, the ARP 125 invokes the application program 115 to restart. For this, the method includes creating the second application process 140 upon receiving an HTTP reply, at 360. The ARP 125 further retrieves the application identification information from the memory 150 and attaches it to the second application process 140, at 370. Matching the identification information includes comparing the one or more parameters associated with the reply with the one or more identification data stored in the memory 150. The second application process 140 parses the received reply and performs such comparisons, in one or more examples.

For example, upon receiving the reply, the ARP 125 determines the kernel socket on which the reply was received. Based on the socket, the ARP 125 can determine the memory portion that stores the identification information associated with the application program 115. Further, the reply includes an application program identifier, such as an application name, GUID, and the like. Using the application program identifier, the ARP 125 can determine the application program 115 that sent the request to the server 120.

Alternatively, as described earlier, the socket on which the reply is received by itself serves as a unique identifier for the pair of the application program 115 and the server 120, and accordingly, the ARP 125 identifies the application program 115 based on the socket.

The ARP 125 further retrieves the application parameter data that the first application process 130 provided for passing on to the application program 115 upon being invoked because of receiving the HTTP reply.

The method further includes the ARP 125 invoking the application program 115 via the second application process 140, at 380. The ARP 125 further passes the parsed HTTP reply and the application parameters that the first application process 130 (original process) stored, at 380. The application parameters may include, for example, user data that the application program 115 was using/processing prior to being terminated. Thus, the application program 115 does not have to request the same information from the user again. Alternatively, or in addition, the application parameters may include other such data that the application program 115 has already accessed/computed prior to the termination.

The method further includes continuing the operation of the application program 115 via the second application process 140 that was newly created by the ARP 125, at 390. The method may loop through again in case the application program 115 has to send further asynchronous HTTP requests to the server 120 (or any other server).

Further, the method handles the case where the server 120 does not send a reply to the client device 110, or sends the reply after a predetermined timeout duration expires. In traditional HTTP client implementations, the application process 130 remains active while waiting for the HTTP reply and a timer is running in that application process 130 to handle the case where the server 120 does not respond. Typically, a predetermined timeout value is set, for example, as an input parameters on the HTTP client API, and the application process 130 exits waiting after the timeout duration expires without receiving a corresponding reply. However, the application process 130 while waiting is still active and holds on to one or more computing resources, such as threads and memory, for at least the timeout duration, thus limiting number of transactions that can be processed at a given time. The technical solutions described herein addresses such technical challenges, because there are no active application processes waiting for a reply from an HTTP server, as described herein. To further handle the timeout or a delayed response from the server 120, the OS 211 periodically scans through a table of HTTP sessions waiting for a reply to check for the timeout condition. If a timeout occurs, the OS 211 creates the new second application process 140 and instructs the ARP 125 that a timeout occurred, causing the ARP 125 to invoke the application program 115 via the second application process 140 informing the application program 115 that the timeout occurred.

The technical solutions described herein facilitate reading HTTP responses in separate processes. Further, the technical solutions facilitate client processes to terminate processing and exit after sending an HTTP client request to a remote server. An asynchronous request can be sent without any application process managing the session or waiting for the reply, leading to minimum system resources being in use while an HTTP client application waits for responses from remote servers, in turn, allowing the client-server system to process a larger number of concurrent transactions.

Thus, the technical solutions described herein improves a computer system, in this case the client computing system as well as the client-server system being used to operate an application program, over presently used systems in which an owning process or thread for the underlying HTTP request (and associated socket) has to be waiting for the reply. The technical solutions described herein allow a client process to issue an HTTP request to a remote server, and then exit, and subsequently creating a new process when the response is received. Such technical solutions help in keeping a number of active application processes under a predetermined limit especially in large OLTP workloads where there may be tens of thousands of outstanding requests on a single OLTP node. The technical solutions thus improve the operation of the OLTP node by making a number of resources used to maintain the active processes or threads to own the sockets manageable.

The present technical solutions may be a system, a method, and/or a computer program product at any possible technical detail level of integration. The computer program product may include a computer readable storage medium (or media) having computer readable program instructions thereon for causing a processor to carry out aspects of the present technical solutions.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present technical solutions may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present technical solutions.

Aspects of the present technical solutions are described herein with reference to flowchart illustrations and/or block diagrams of methods, apparatus (systems), and computer program products according to embodiments of the technical solutions. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present technical solutions. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are to be construed in the broadest sense, superseding any other implied definitions hereinbefore or hereinafter unless expressly asserted to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

It will also be appreciated that any module, unit, component, server, computer, terminal or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Such computer storage media may be part of the device or accessible or connectable thereto. Any application or module herein described may be implemented using computer readable/executable instructions that may be stored or otherwise held by such computer readable media.

The descriptions of the various embodiments of the technical features herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for reading HTTP responses in separate processes being executed by a client computing device, the method comprising:
    sending an asynchronous HTTP request or a synchronous HTTP request from a first instance of an application program, the first instance is executed by a first process on a machine, the HTTP request being sent for receipt by a server;
    storing application identification associated with the HTTP request, wherein the application identification comprises unique identifiers including a processor identifier, a global unique identifier, and a kernel socket identifier used to send the asynchronous HTTP request to the server;
    terminating the first process on the machine responsive to sending the asynchronous HTTP request and continuing the first process responsive to sending the synchronous HTTP request, wherein the asynchronous HTTP request is sent and the first process is terminated responsive to receiving, at an asynchronous request processor (ARP), a command indicating the asynchronous HTTP request, and wherein the synchronous HTTP request is sent and the first process is continued responsive to receiving a command indicating the synchronous HTTP request; and
    in response to receiving a HTTP reply to the asynchronous HTTP request from the server:
        determining that the HTTP reply is corresponding to the asynchronous HTTP request based on the application identification;
        creating a second process on the same machine, wherein the second process is created by the ARP;
        invoking a second instance of the application program, the second instance is associated to start execution via the second process; and
        passing the HTTP reply to the second instance of the application program that is associated with the second process that was created in response to receiving the HTTP reply from the server.

2. The computer-implemented method of claim 1, wherein the application identification comprises a unique identifier of the application program.

3. The computer-implemented method of claim 1, further comprising:
    prior to termination of the first process:
        receiving, from the first process, application parameters associated with execution state of the first instance of the application program; and
        storing the application parameters; and
        upon receiving the HTTP reply from the server, retrieving the application parameters by the second instance of the application program via the second process.

4. The computer-implemented method of claim 1, wherein determining that the HTTP reply is corresponding to the asynchronous HTTP request is based on a kernel socket on which the HTTP reply is received.

5. The computer-implemented method of claim 1, wherein determining that the HTTP reply is corresponding to the asynchronous HTTP request is based on a kernel socket on which the HTTP reply is received, and an application program identifier associated with the HTTP reply.

6. A system comprising:
    a server; and
    a client device that communicates with the server using HTTP, the client device configured to read HTTP responses in separate processes being executed by the client device, the client device configured to:
    send an asynchronous HTTP request or a synchronous HTTP request from a first instance of an application program, the first instance is executed by a first process, the HTTP request being sent for receipt by a server;
    store application identification associated with the HTTP request, wherein the application identification comprises unique identifiers including a processor identifier, a global unique identifier, and a kernel socket identifier used to send the asynchronous HTTP request to the server;
    terminate the first process responsive to sending the asynchronous HTTP request and continue the first process responsive to sending the synchronous HTTP request, wherein the asynchronous HTTP request is sent and the first process is terminated responsive to receiving, at an asynchronous request processor (ARP), a command indicating the asynchronous HTTP request, and wherein the synchronous HTTP request is sent and the first process is continued responsive to receiving a command indicating the synchronous HTTP request; and
    in response to receiving a HTTP reply to the asynchronous HTTP request from the server:
        determine that the HTTP reply is corresponding to the asynchronous HTTP request based on the application identification; and create a second process, wherein the second process is created by the ARP;

invoke a second instance of the application program, the second instance is associated to start execution via the second process; and pass the HTTP reply to the second instance of the application program that is associated with the second process that was created in response to receiving the HTTP reply from the server.

7. The system of claim 6, wherein the application identification comprises a unique identifier of the application program.

8. The system of claim 6, the client computing device further configured to:

prior to termination of the first process:

receiving, from the first process, application parameters associated with execution state of the first instance of the application program; and storing the application parameters; and upon receiving the HTTP reply from the server, retrieving the application parameters by the second instance of the application program via the second process.

9. The system of claim 6, wherein determining that the HTTP reply is corresponding to the asynchronous HTTP request is based on a kernel socket on which the HTTP reply is received.

10. The system of claim 6, wherein determining that the HTTP reply is corresponding to the asynchronous HTTP request is based on a kernel socket on which the HTTP reply is received, and an application program identifier associated with the HTTP reply.

11. A computer program product comprising a computer readable storage medium having program instructions embodied therewith, the program instructions executable by a processing circuit of a client computing device to cause the processing circuit to read HTTP responses in separate processes, the processing circuit configured to perform:

sending an asynchronous HTTP request or a synchronous HTTP request from a first instance of an application program, the first instance is executed by a first process, the HTTP request being sent for receipt by a server;

storing application identification associated with the HTTP request, wherein the application identification comprises unique identifiers including a processor identifier, a global unique identifier, and a kernel socket identifier used to send the asynchronous HTTP request to the server;

terminating the first process responsive to sending the asynchronous HTTP request and continue the first process responsive to sending the synchronous HTTP request, wherein the asynchronous HTTP request is sent and the first process is terminated responsive to receiving, at an asynchronous request processor (ARP), a command indicating the asynchronous HTTP request, and wherein the synchronous HTTP request is sent and the first process is continued responsive to receiving a command indicating the synchronous HTTP request; and in response to receiving a HTTP reply to the asynchronous HTTP request from the server:

determining that the HTTP reply is corresponding to the asynchronous HTTP request based on the application identification; and creating a second process, wherein the second process is created by the ARP;

invoking a second instance of the application program, the second instance is associated to start execution via the second process; and passing the HTTP reply to the second instance of the application program that is associated with the second process that was created in response to receiving the HTTP reply from the server.

12. The computer program product of claim 11, wherein the application identification comprises a unique identifier of the application program.

13. The computer program product of claim 11, the processing circuit further configured to perform:

prior to termination of the first process:

receiving, from the first process, application parameters associated with execution state of the first instance of the application program; and storing the application parameters; and upon receiving the HTTP reply from the server, retrieving the application parameters by the second instance of the application program via the second process.

14. The computer program product of claim 11, wherein determining that the HTTP reply is corresponding to the asynchronous HTTP request is based on a kernel socket on which the HTTP reply is received.

* * * * *